March 4, 1924.
J. A. CAMPBELL
HEADLIGHT INDICATOR
Filed Jan. 8, 1923
1,486,011
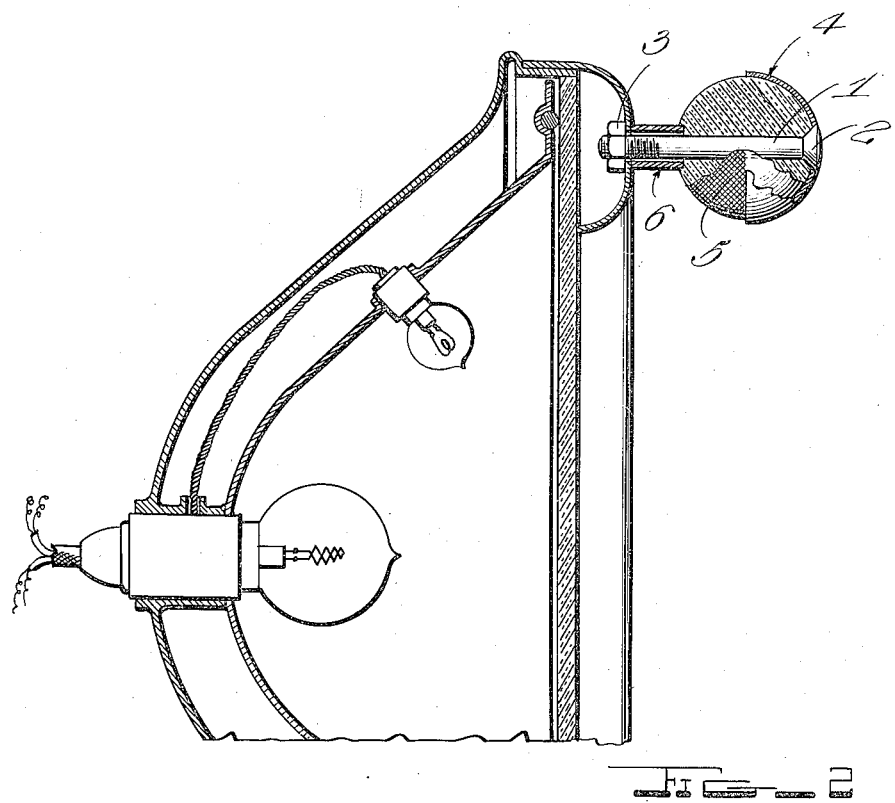
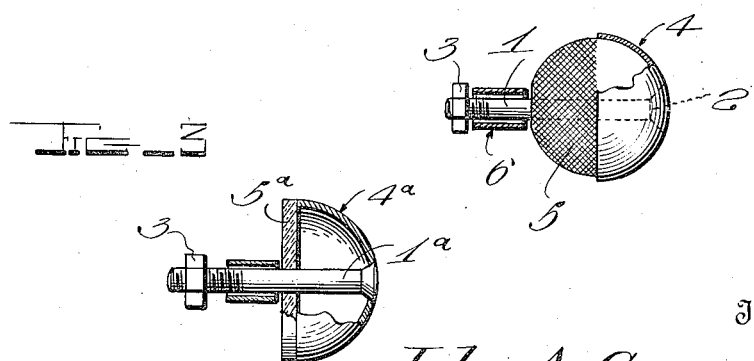
Inventor
John A. Campbell
Witness Patented Mar. 4, 1924.

1,486,011

UNITED STATES PATENT OFFICE.

JOHN A. CAMPBELL, OF CARBONDALE, ILLINOIS.

HEADLIGHT INDICATOR.

Application filed January 8, 1923. Serial No. 611,407.

*To all whom it may concern:*

Be it known that I, JOHN A. CAMPBELL, a citizen of the United States, residing at Carbondale, in the county of Jackson and State of Illinois, have invented certain new and useful Improvements in Headlight Indicators; and I do declare the following to be a full, clear, and exact description of the invention, such as will enable others skilled in the art to which it appertains to make and use the same.

My invention has for its object to provide a simple and inexpensive attachment for automobile headlights, which will show at a glance whether the headlights are dimly lighted. It often happens that the light from dimmed headlights is so faint that the driver of the machine cannot ascertain whether the headlights are operating, but by the use of my invention, the driver can readily determine from his seat, whether the headlights are dimly illuminated.

With the foregoing in view, the invention resides in the novel subject matter hereinafter described and claimed, the description being supplemented by the accompanying drawings.

Figure 1 is a vertical sectional view through an automobile headlight showing the application of my invention to the headlight rim.

Figure 2 is a side elevation partly in section of the attachment.

Figure 3 is a view similar to Fig. 2 but showing a different form of construction.

In Figs. 1 and 2 of the drawing, the numeral 1 designates a bolt having a head 2 on one end and a nut 3 on its other end. A reflector 4 having its reflecting surface facing the nut 3, is provided with a central opening receiving the bolt and contacting with the inner side of the bolt head 2, said reflector being preferably although not necessarily of substantially concavo-convex form. A body of translucent material 5, preferably a sphere of colored glass is provided with a central opening receiving the bolt 1 and the front portion of said body 5 is covered by the reflector 4. As indicated, the rear portion of the body 5 is preferably checkered.

A spacing sleeve 6 surrounds the bolt 1 between the body 5 and the nut 3 and is adapted to space the body and the reflector 4 in advance of the rim of a headlight, when the bolt is passed through an opening in this rim and the nut 3 applied, as shown in Fig. 1.

By employing the construction shown and described, or a similar construction, when the headlight is dimly illuminated, the light therefrom will illuminate the translucent body 5, due to the provision of the reflecting surface at the front side of the lens. Thus, the driver can readily ascertain the condition of the headlights.

It will be obvious that the reflector 4 and the body 5 may be of any desired configuration and in Fig. 3, I have shown merely a disk of colored glass $5^a$ mounted on the bolt $1^a$ in contact with the rear edge of the reflector $4^a$. This construction will operate in the same manner as that above described and equally as advantageously.

As excellent results may be obtained from the details disclosed, they may be followed if desired. It is to be understood however that the present disclosure is for illustrative purposes only and that within the scope of the invention as claimed, numerous changes may be made.

I claim:

1. A headlight indicator comprising a stem adapted to be secured to and to extend forwardly from a headlight casing, a reflector carried by said stem and adapted to be spaced thereby in front of the headlight, and a translucent body mounted on the stem at the rear side of said reflector to diffuse the rays of light reflected therefrom.

2. A headlight indicator comprising a stem adapted to be connected to and to extend forwardly from a headlight casing, a rearwardly facing reflector mounted on the front end of said stem, a translucent body mounted on said stem in contact with the rear portion of the reflector, and a spacing sleeve surrounding the stem behind said translucent body for contact with the rim of the headlight casing.

3. A headlight indicator comprising a bolt having a head at one end and a nut at its other end, a reflector facing the nut and having an opening receiving said bolt, said reflector being in contact with the bolt head, a translucent body having an opening receiving the bolt, said body contacting with the rear portion of said reflector, and a spacing sleeve surrounding the bolt between said body and said nut, said sleeve being intended to space said body forwardly from a headlight rim through which the bolt is passed.

In testimony whereof I have hereunto affixed my signature.

JOHN A. CAMPBELL.